(12) United States Patent
Wedeck et al.

(10) Patent No.: US 6,273,564 B1
(45) Date of Patent: Aug. 14, 2001

(54) EYEGLASS FRAME FOR REMOVAL AND INSERTION OF LENSES

(75) Inventors: David Wedeck, 423 Forest Ave., Teaneck, NJ (US) 07666; Edward Cheslock, Delta, PA (US); Brian Hoffman, Princeton, NJ (US); Norman Andreasen, Hillside, NJ (US); Robert White, Wayne, NJ (US)

(73) Assignee: David Wedeck, Teaneck, NJ (US)

( * ) Notice: Subject to any disclaimer, the term of this patent is extended or adjusted under 35 U.S.C. 154(b) by 0 days.

(21) Appl. No.: 09/539,684

(22) Filed: Mar. 30, 2000

Related U.S. Application Data

(63) Continuation-in-part of application No. 09/336,541, filed on Jun. 19, 1999, now abandoned, which is a continuation-in-part of application No. 08/990,056, filed on Dec. 12, 1997, now Pat. No. 5,914,767, which is a continuation-in-part of application No. 08/794,321, filed on Feb. 3, 1997, now Pat. No. 5,760,866, which is a continuation-in-part of application No. 09/689,223, filed on Aug. 7, 1996, now abandoned.

(51) Int. Cl.$^7$ ................................................. G02B 1/08
(52) U.S. Cl. ......................................... 351/92; 351/90
(58) Field of Search ............................. 351/92, 90, 91, 351/93, 94, 95, 96, 97, 98, 99, 100, 101, 102, 103, 41

(56) References Cited

U.S. PATENT DOCUMENTS 2,754,724 * 7/1956 Fishman ............................... 381/92
5,914,767 * 6/1999 Wedeck et al. ..................... 381/92

* cited by examiner

Primary Examiner—Hung Xuan Dang
(74) Attorney, Agent, or Firm—Richard B. Klar

(57) ABSTRACT

The invention relates to an eyeglass frame having a portion of the frame removably coupled to the body of the frame to permit the removal and replacement of the lenses in the frame.

10 Claims, 13 Drawing Sheets

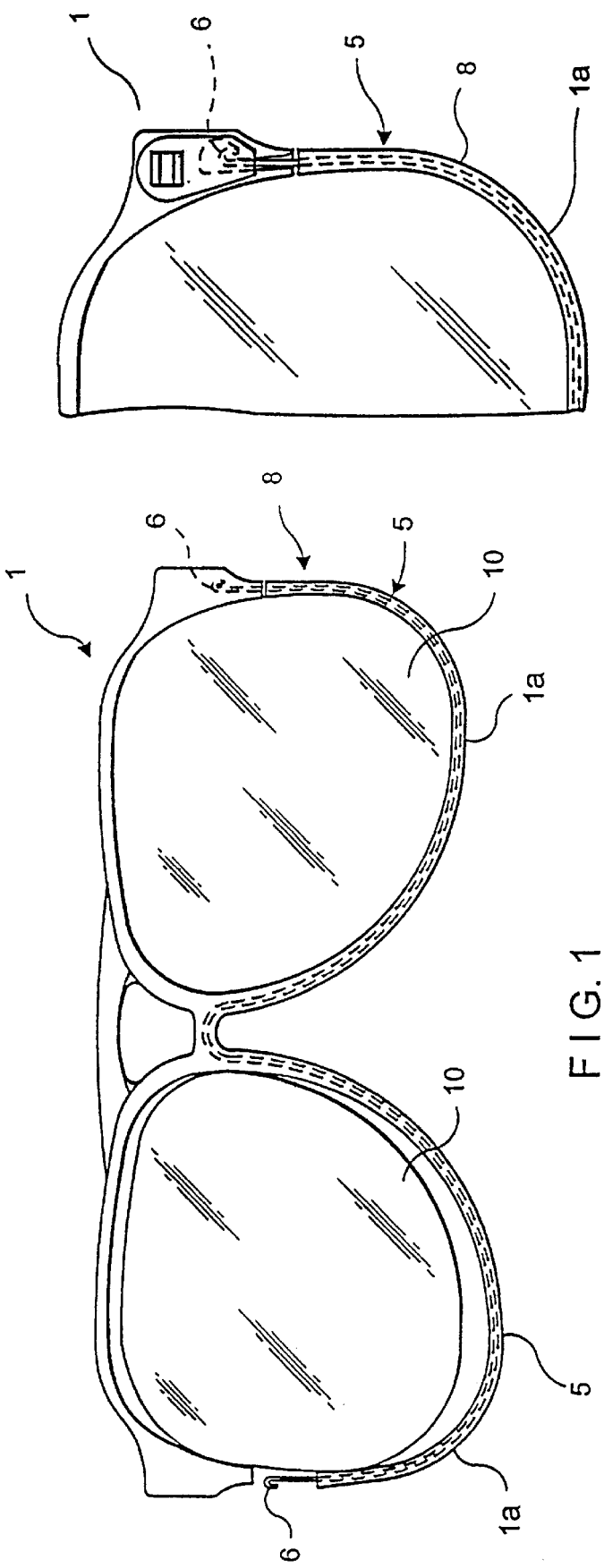

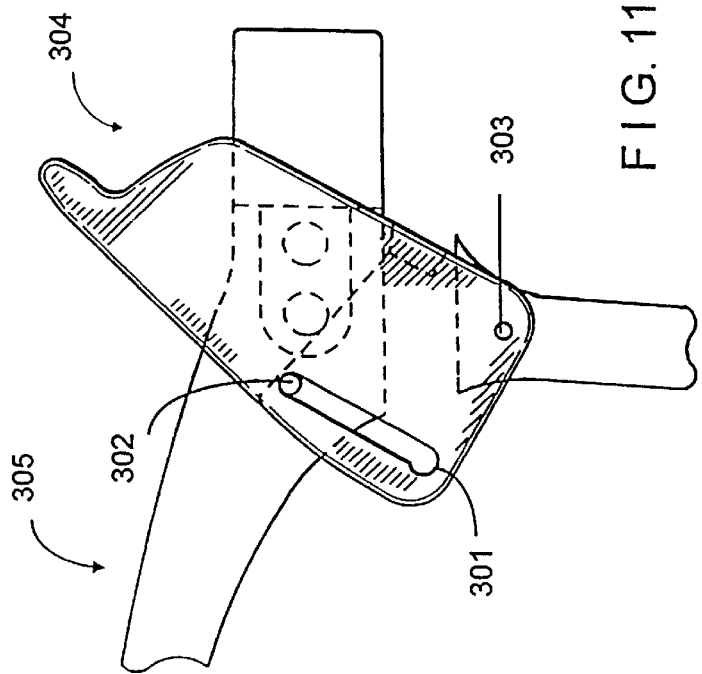
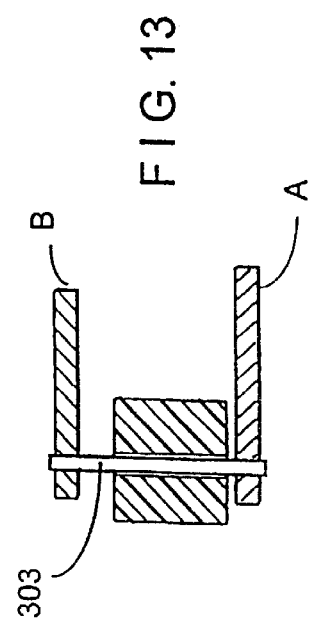
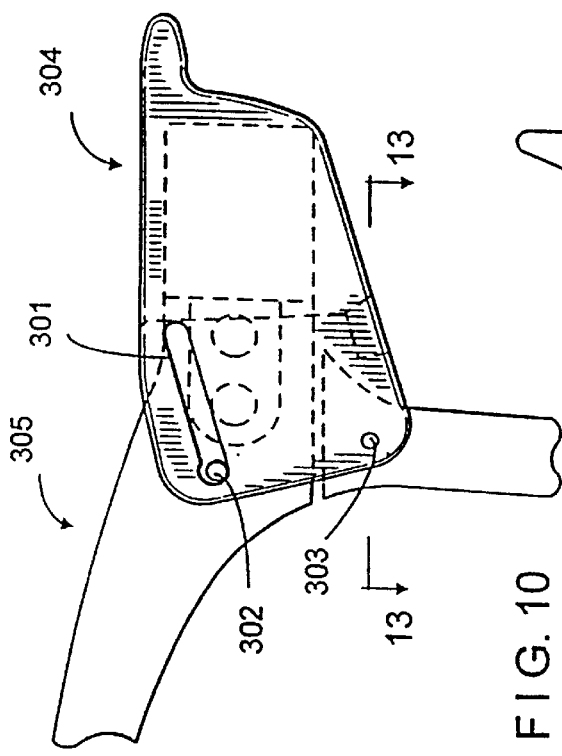
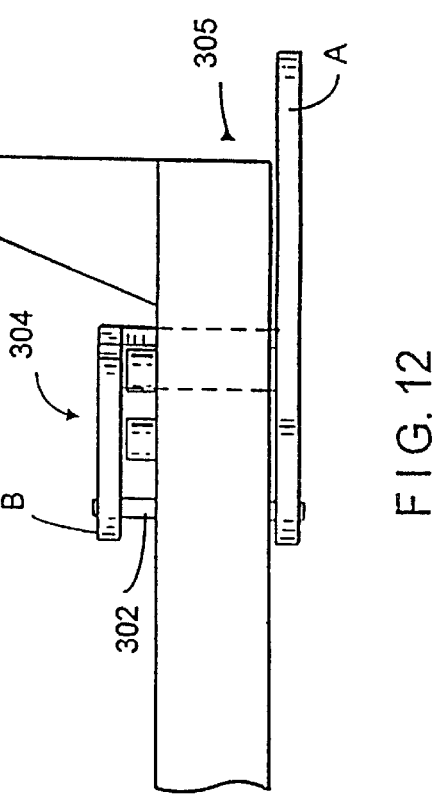
FIG. 11
FIG. 13
FIG. 10
FIG. 12

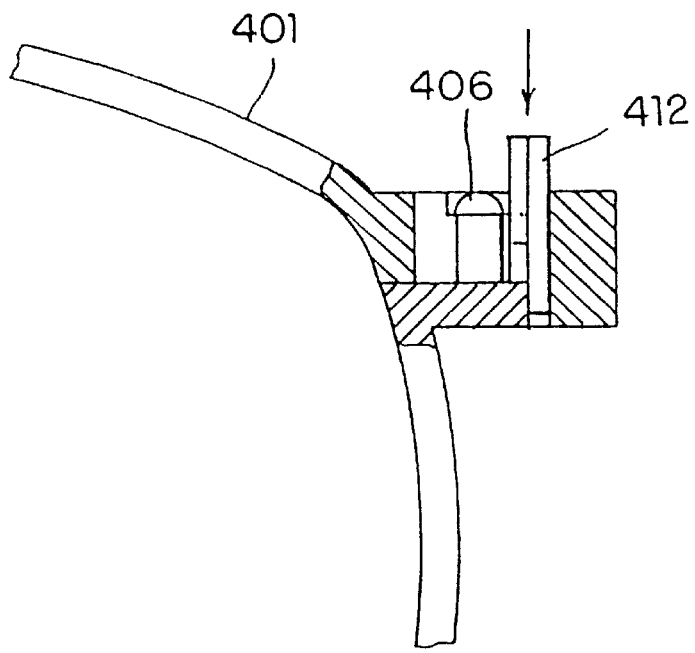
F I G. 17
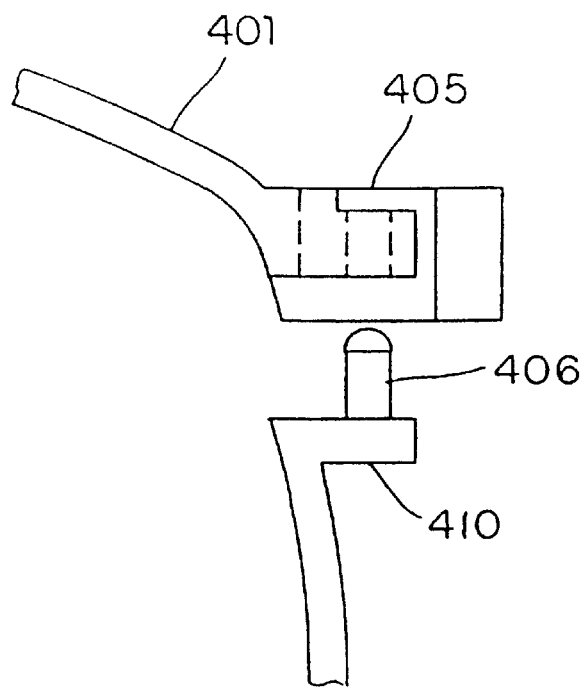
F I G. 18

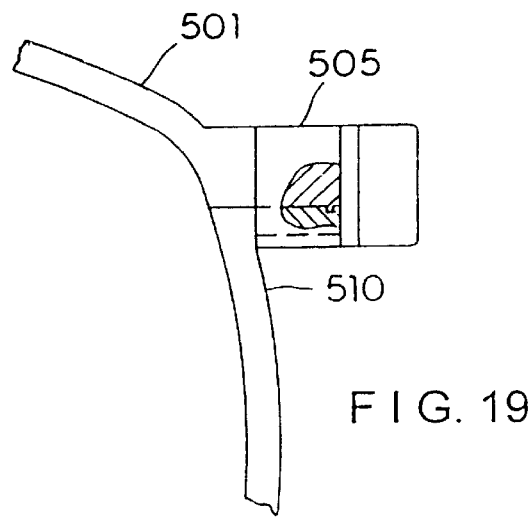
F I G. 19
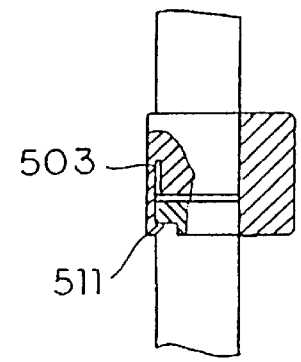
F I G. 21
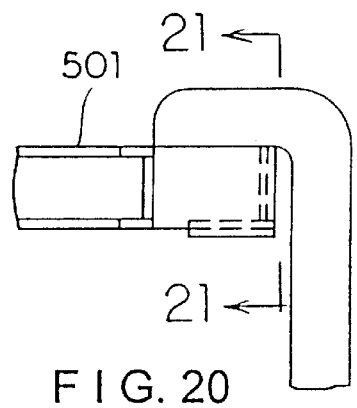
F I G. 20
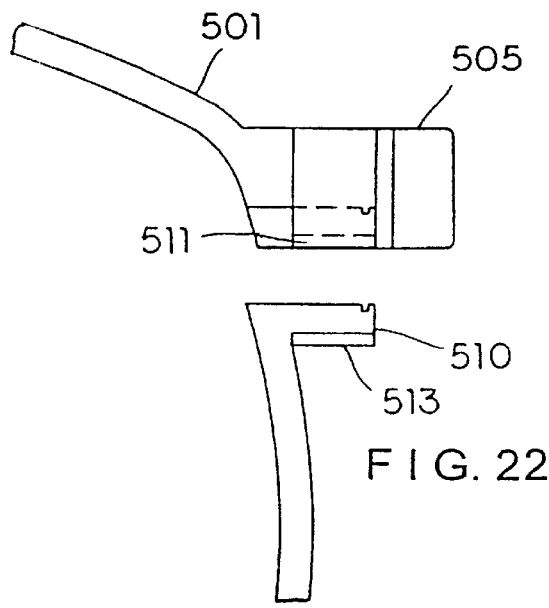
F I G. 22
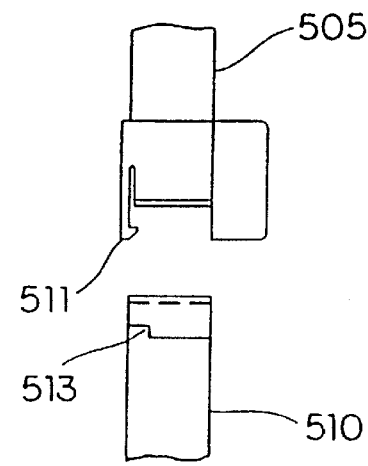
F I G. 23

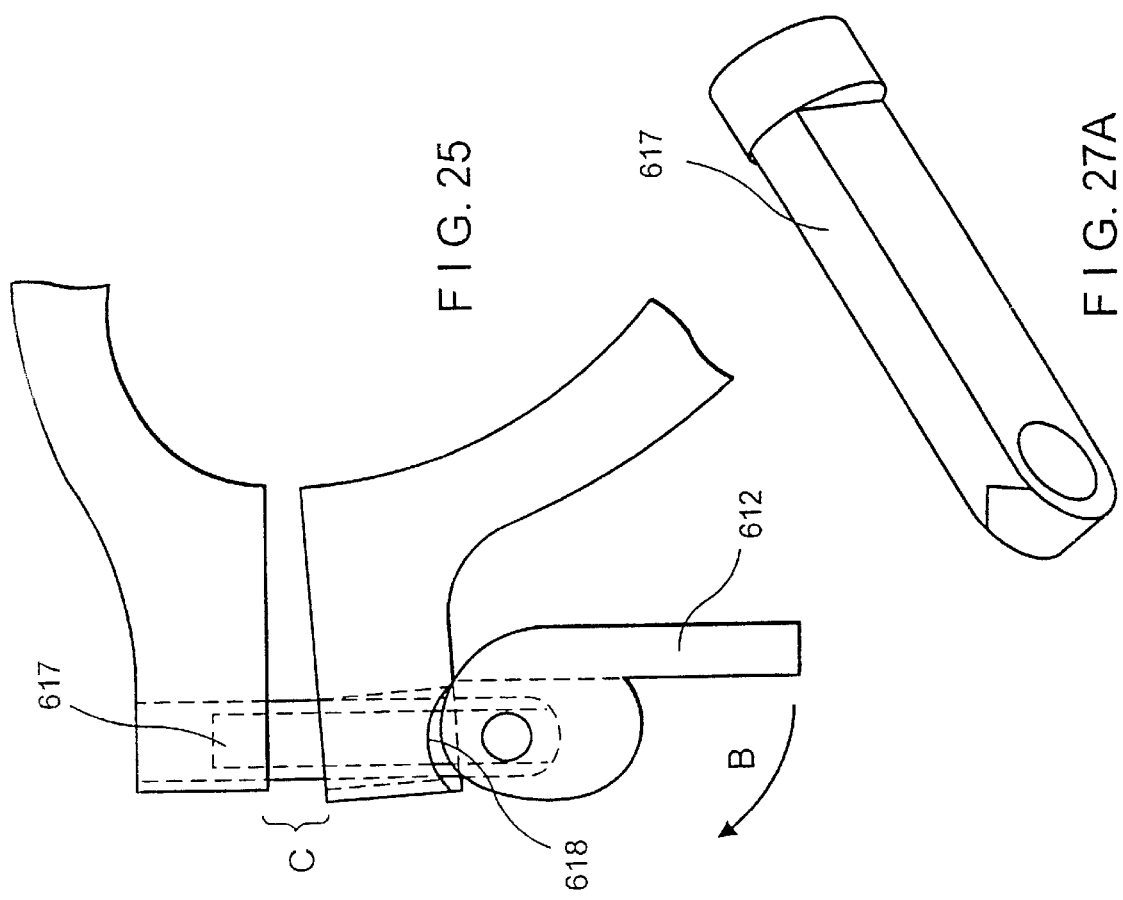
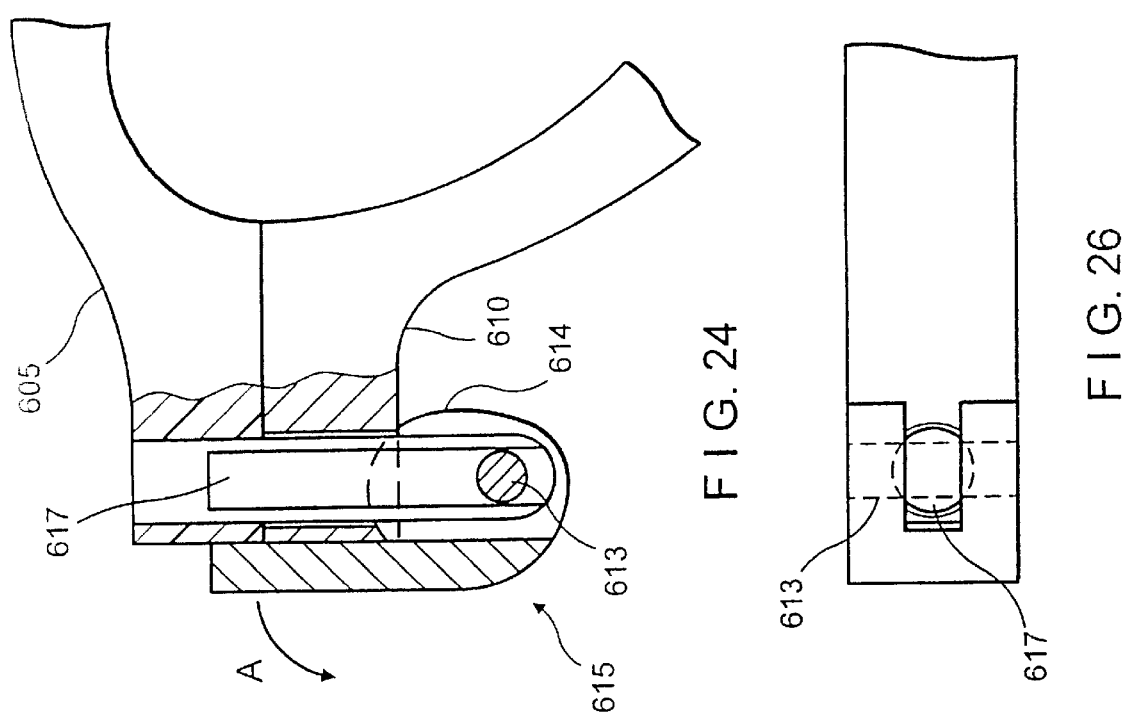

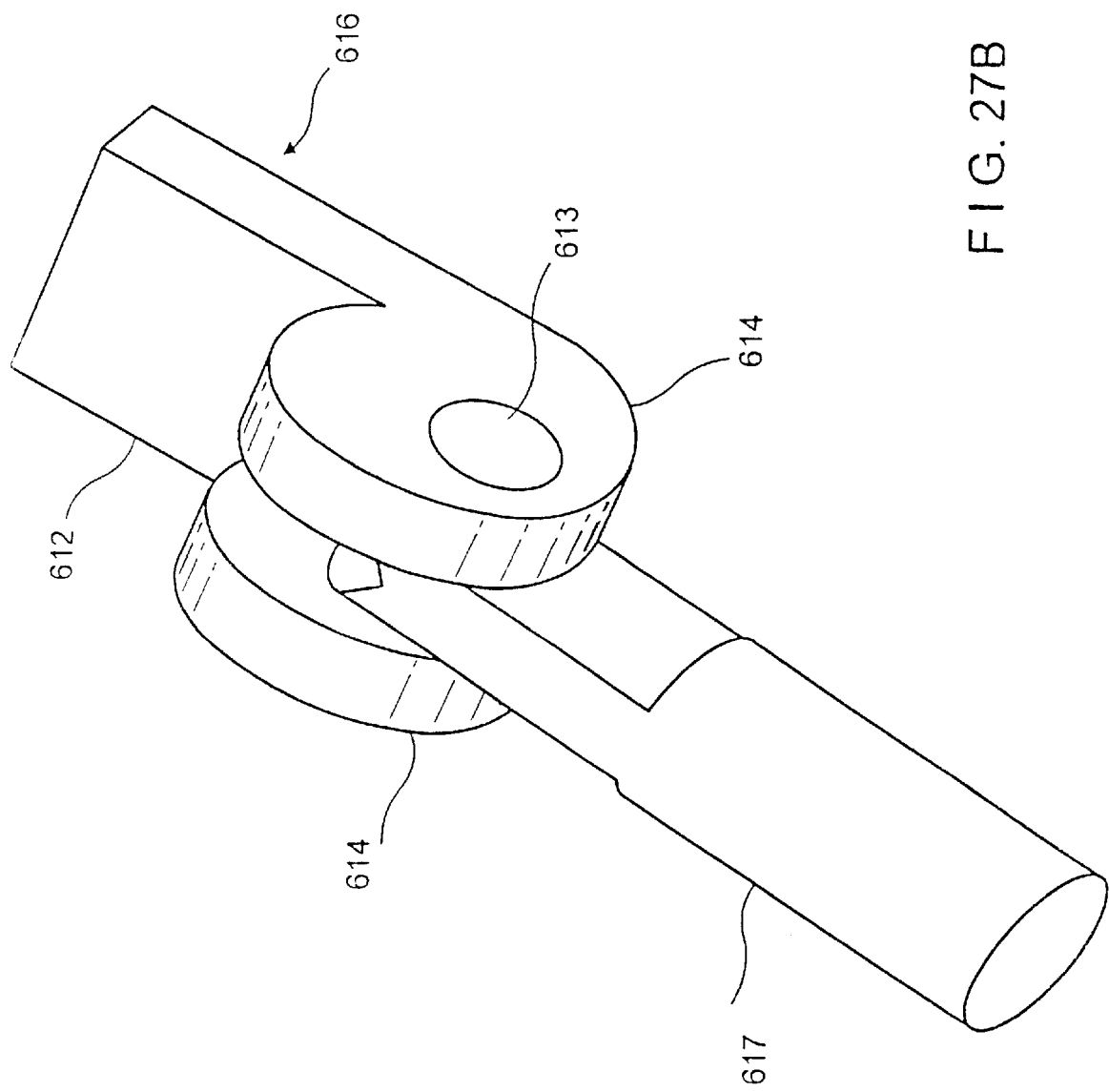

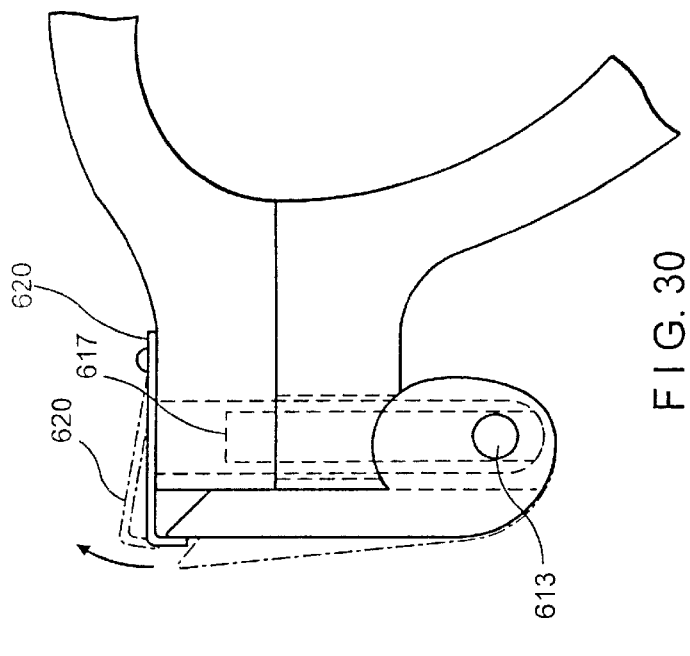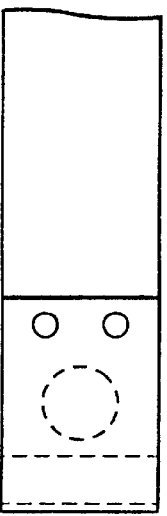
FIG. 30
FIG. 31
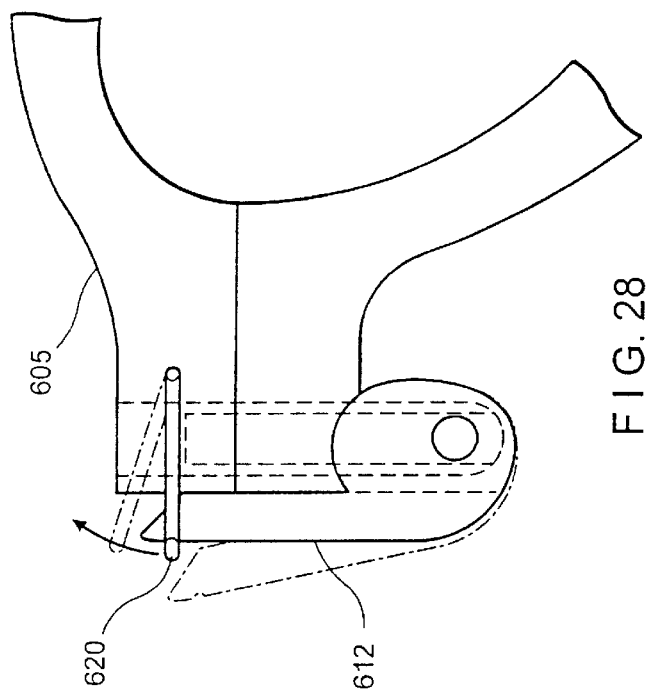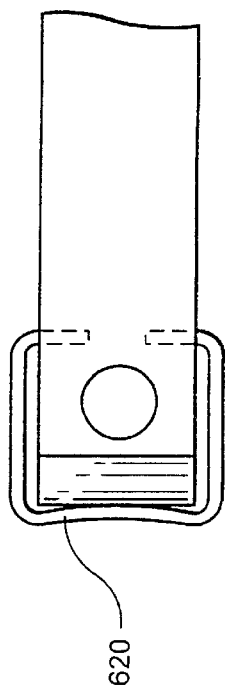
FIG. 28
FIG. 29

EYEGLASS FRAME FOR REMOVAL AND INSERTION OF LENSES

The present application is a continuation in part application of a continuation in part application Ser. No. 09/336,541 filed on Jun. 19, 1999 now abandoned, which in turn is a continuation in part application, Ser. No. 08/990,056, filed Dec. 12, 1997 which issued on Jun. 22, 1999 as U.S. Pat. No. 5,914,767, and which in turn is a continuation in part of U.S. patent application Ser. No. 08/794,321 which was filed on Feb. 3, 1997 and issued as U.S. Pat. No. 5,760,866 on Jun. 2, 1998 and which in turn is a continuation in part of U.S. patent application Ser. No. 08/689,223 filed on Aug. 7, 1996, now abandoned, for which priority is claimed herein pursuant to 35 USC 120.

BACKGROUND OF THE INVENTION

1. Field of the Invention

The present invention relates to an eyeglass frame, in particular it relates to an eyeglass frame where at least a portion of the frame can be removably coupled to the body of the frame to permit the removal and replacement of the lenses in the frame.

2. The Prior Art

The prior art teaches a number of eyeglass frames. For example, the U.S. Pat. No. 3,826,564 to Werling has a hinge mechanism and a clasp mechanism. The clasp and hinge mechanisms are cumbersome, conspicuously visible, and aesthetically displeasing. The frame can be opened up to permit the lenses to be removed. Similarly the U.S. Pat. No. 2,479,754 to Marks discloses a frame that permits the lenses to be removed. As shown in FIG. 1 of Marks', the frame has a hinge base 16 with a stud 17 that goes through the top portion 14. Hinge screw 16 provides a pivot for a portion at the temple.

All of the prior art proposals are both cumbersome and aesthetically inappropriate for today's eyeglass frames, notably designer frames, which are primarily meant to be aesthetically pleasing. It would, therefore, be most desirable to provide a lens frame which would permit lenses to be removed, while at the same time requiring a minimum amount of disassembly and reassembly on the part of the wearer and also an insignificant amount of clasping or hinge mechanisms on the frame itself, which would add unnecessary weight to the frame and also would be unattractively visible on the frame when worn by the wearer.

SUMMARY OF THE INVENTION

It is a principle object of the invention to provide an aesthetically pleasing, simple mechanism which permits the frame to be opened and for lenses to be removed and replaced. Such an invention will permit new lenses to be inserted when the old lenses become scratched or a new prescription is required. In addition, lenses to be used in the outdoors, such as prescription sunglass lenses or tinted lenses can be inserted and the same frame can be utilized.

It is a further object of the invention to provide an invention which can be used for both metal frames as well as for plastic eyeglass frames.

It is a further object of the invention to provide another embodiment utilizing a cam to facilitate the opening and closing of the frame and an alignment pin and alignment recess to align the upper and bottom portions of the frame during opening and closing of the frame.

It is yet another object of the invention to provide a mechanism for restricting the amount of movement by which the frame can be opened to prevent the lenses from accidentally falling out of the frame while either being opened or in the fully opened position by limiting the degree to which the frame opens and providing guide means in the form of a slot and a journey pin traveling within the slot and to ensure that the frame is closed flush in the closed position.

Other objects will become known from the following drawings and description.

DESCRIPTION OF THE DRAWINGS

FIG. 1 is a front view of the eyeglass frame showing the retaining wire member unlocked on the left side;

FIG. 2 is a partial rear view, showing the retaining member in locked position on the eyeglass frame;

FIGS. 7–9 illustrate another embodiment of the present invention in which:

FIG. 7 is a partial sectional view of an embodiment of the invention with the frame in the closed position;

FIG. 8 is a partial sectional view showing the rotatable latch rotated as the latch pin and the cam become tightly compressed against each other due to the cam profile; and FIG. 9 is a partial sectional view showing the frame in the opened position.

FIGS. 10–13 illustrate another embodiment of the present invention utilizing a slot, a journey pin and a pivot pin and a lever, in which:

FIG. 10 illustrates a partial view of the frame in which the frame is in a substantially closed position and the journey pin and the pivot pin are at the closest proximity to each other when the frame is closed;

FIG. 11 shows the embodiment of FIG. 10 with the lever rotated so that the frame is in the open position and the journey pin and the pivot pin being the furthest distance away from each other;

FIG. 12 is a sectional view of the embodiment of FIG. 10 showing the lever is pivotally connected to the frame by the pivot pin; and FIG. 13 is a sectional view illustrating that the pivot pin 303 goes through both sides A and B of the lever and the frame.

FIGS. 14–18 illustrate another embodiment of the present invention in which:

FIG. 14 is a view of an embodiment of the present invention;

FIG. 15 is a partial sectional top view of the embodiment of FIG. 14;

FIG. 16 is the release member for the embodiment of FIG. 14;

FIG. 17 is a partial sectional view of the embodiment of FIG. 14 illustrating use of the release member; and FIG. 18 is a view illustrating the upper and bottom temple portions of the frame separated from each other.

FIGS. 19–23 illustrate another embodiment of the present invention in which:

FIG. 19 is a partial sectional view of the embodiment of the present invention;

FIG. 20 is a top view of the embodiment of FIG. 19;

FIG. 21 is a partial sectional view of FIG. 19 illustrating the engagement between the overhanging portion of the top temple portion and the recess portion of the bottom temple portion of the frame when the frame is in the securely closed position of FIG. 19;

FIG. 22 is a view of the embodiment of FIG. 19 when the frame is open and the upper temple and bottom temple portion are disengaged from each other; and FIG. 23 is a view of FIG. 22 illustrating the disengagement of the overhanging portion of the top temple portion from the recess portion of the bottom temple portion when the frame is in the open position of FIG. 22;

FIGS. 24–27 illustrate another embodiment of the invention for which FIG. 25 is a modification thereof, in which:

FIG. 24 illustrates a partial sectional view of the present invention employing a cam mechanism for facilitating the opening and closing of an eyeglass frame at its temple portions in which the frame is shown in its closed position;

FIG. 25 is the present invention of FIG. 24 in an open position modified with the temple portion having an inwardly curved portion to accommodate the head of the cam therein;

FIG. 26 is a top view of FIG. 24;

FIG. 27A is the hinge pin of the cam mechanism of FIG. 24;

FIG. 27B illustrates the hinge pin pivotally coupled to the cam lock of the cam mechanism without the frame for simplicity of illustration;

FIGS. 28–29 illustrate another embodiment of the present invention in which a spring wire or clip provides a releasing mechanism for an arm of the cam lock in which:

FIG. 28 illustrates a partial sectional view of the embodiment of the invention with the arrow indicating how the spring wire or clip latch mechanism releases the arm of the cam lock to open the frame;

FIG. 29 is a top view of FIG. 28;

FIGS. 30–31 is another embodiment of a release mechanism for a cam lock in which the spring lock or clip latch mechanism has an L-shaped configuration, in which:

FIG. 30 is a partial sectional view of the embodiment of the of the invention with the arrow indicating how the spring wire or clip latch mechanism releases the arm of the cam mechanism to open the frame;

FIG. 31 is a top view of FIG. 30; and

DETAILED DESCRIPTION OF PREFERRED EMBODIMENTS

Figure 3A:
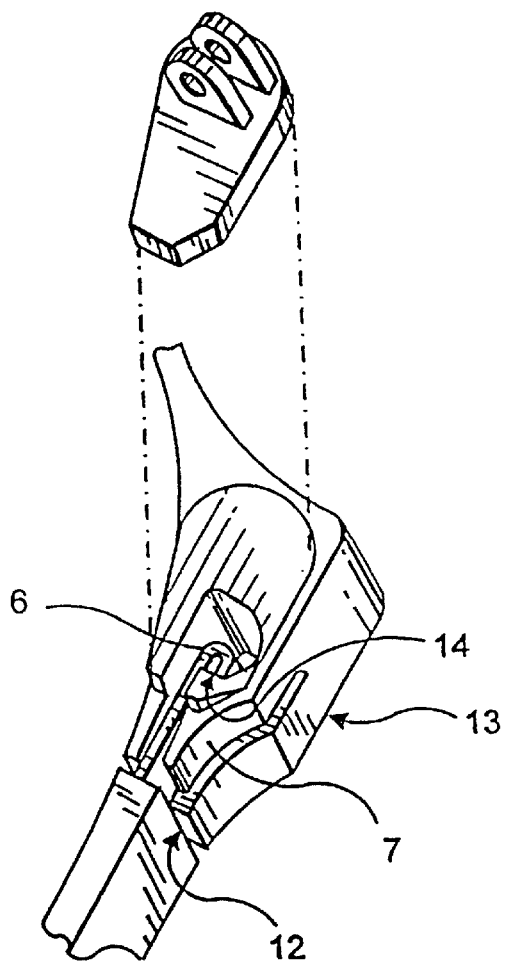
FIG. 3a is a partial perspective exploded, view of the frame in a locked or latched position.
Figure 3B:
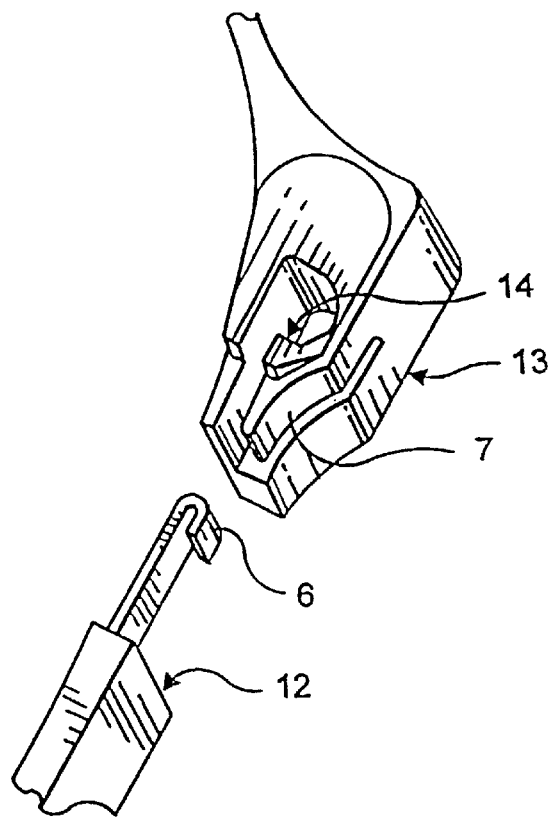
FIG. 3b is the same as FIG. 3a except the retaining member or hook is in a disengaged position.
Figure 3C:
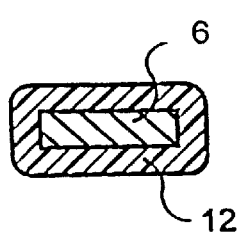
FIGS. 3c and 3d show a section of the bottom part of the frame (taken from FIG. 1), showing two different shapes of the wire inside.
Figure 3D:
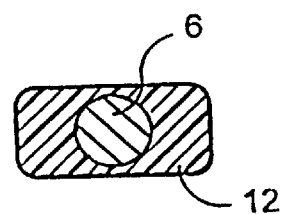

Referring now to the drawings, and in particular the embodiment of FIGS. 1–4c, reference is made to FIG. 1 in which an eyeglass frame 1, in this case made of plastic is shown. This can be seen from the drawings in the bottom portion 1a of the frame 1 which has a spring mechanism 5 therein. The spring mechanism 5 terminates in the preferably hook-shaped wire 6 which latches on to a portion 13 of the frame 1. As can be seen in FIGS. 3a and 3b, this hook mechanism 6 latches on so that the upper part 13 of the frame 1 attaches to the lower portion 1a of the frame 1 in which the spring 5 is embedded therein.

Figure 4C:
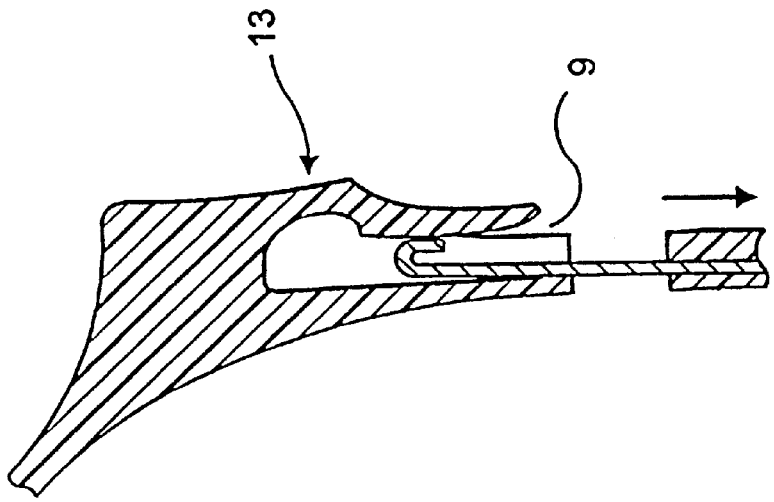
FIGS. 4a–c show three different stages of unlocking the frame in order to change the lens.
Figure 4B:
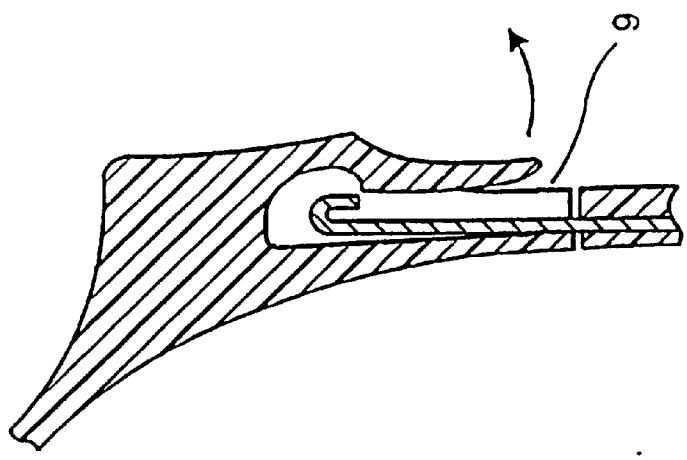
Figure 4A:
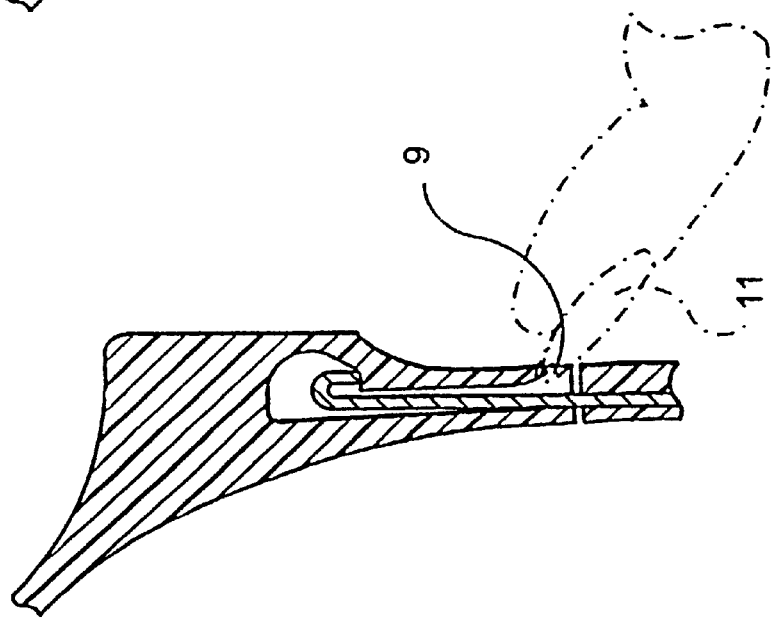

FIGS. 4a–4c show the manner in which this mechanism can be released. The side portion 2 of the frame 1 has a little latch or groove 9 which can be pulled by an implement or fingernail 11, so as to release the hook portion 6 of the wire 5 therefrom and permitting the frame 1 to open up. This disengagement can be done on both ends of the eyeglass frame 1 and permits the lenses 10 to be removed and replaced.

This wire retainer or hook 6 is perfectly formed to the shape of the frame 1 and is tempered to provide a slight spring action. The cross section can either be round (FIG. 3C) or rectangular(FIG. 3D), but can be made round and flattened and folded on one end. The round would more easily be contoured to the shapes of the frames. Alternatively, the wire 5 does not have to travel the full width of the glasses but can extend into the end of the frame by approximately 1/10 of an inch. A plastic frame then would be able to serve as a display and the wire can act as a retainer. The plastic in this case would have to be carefully chosen so that the proper spring action can be obtained and there would be no fatigue failure after repeated uses.

Figure 5:
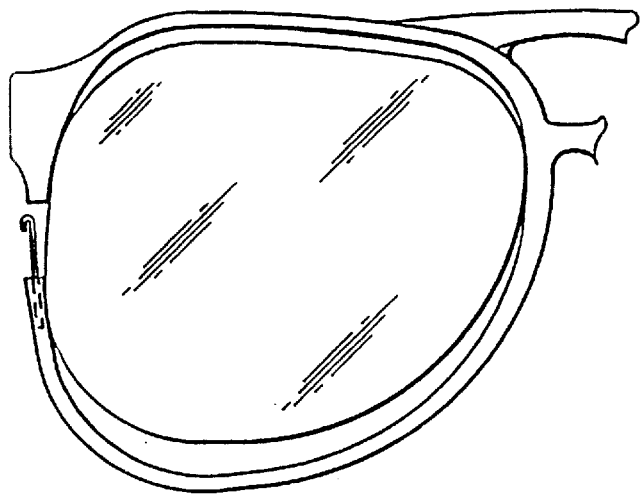
FIG. 5 shows the combination of a plastic frame where the frame itself includes a portion that acts as a spring.

The retainer plate portion 14 of the frame which is shown as part of the retaining means would require that the hinge or retainer would preferably be assembled in the post molding operation. The retainer plate 14 keeps the retainer 6 from disengaging from the rear without pulling out the catch as shown in FIG. 5.

The retainer plate could be designed separately assembled, allowing the retainer to be molded in as it is presently. The molded in catch can be operated with a thumbnail or any flat pointed object, such as a pocket knife or a small screwdriver.

The plastic frame itself can be molded in the open position.

Figure 6:
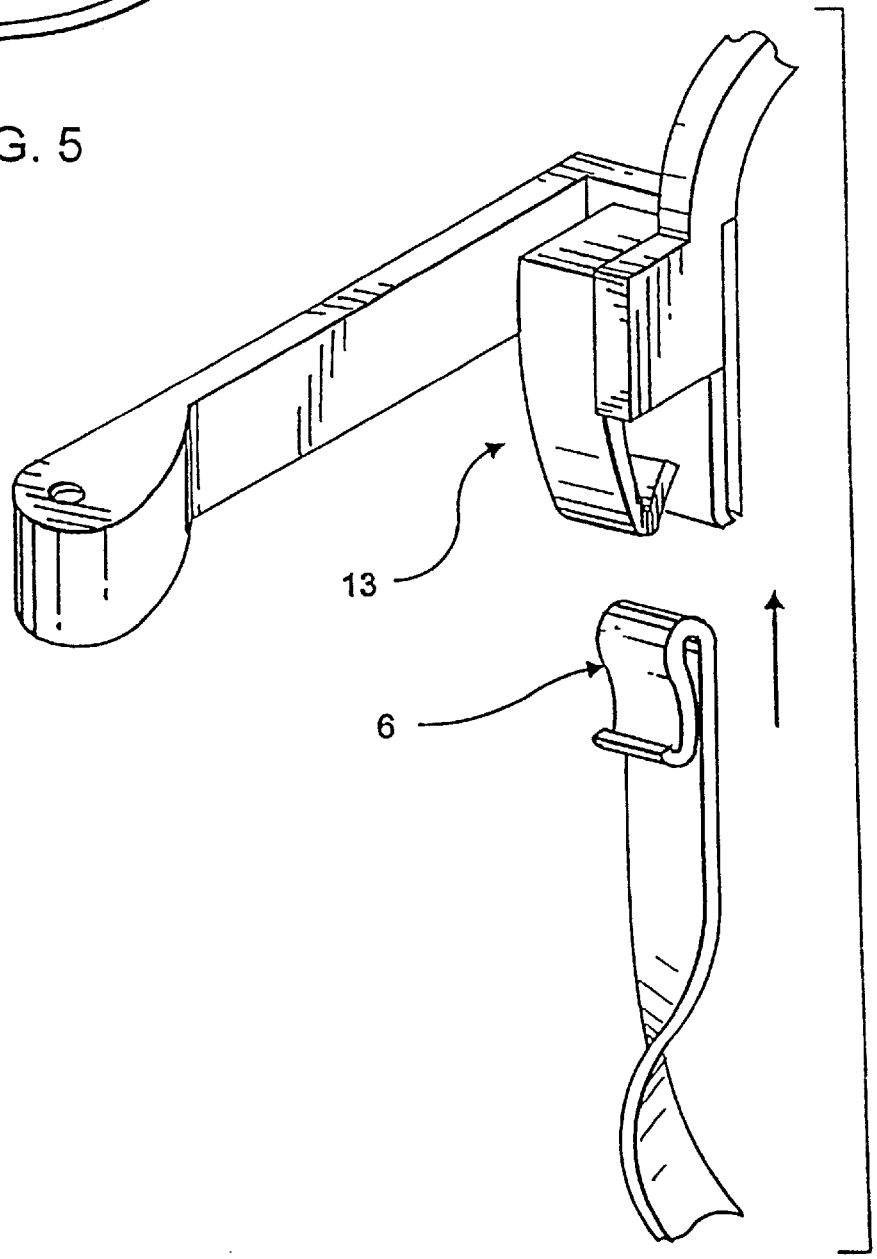
FIG. 6 shows a metal frame embodiment in a locked position.

Referring now to the second embodiment of a metal or wire-framed glasses, as shown in FIG. 6, a similar catch mechanism is employed in which a portion of the frame 1 acts as the hook or retainer piece 6 that latches in to the upper portion 13 of the frame 1.

Figure 7:
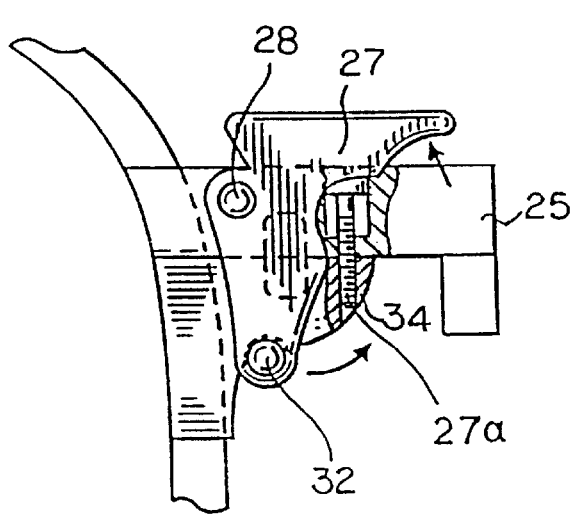
Figure 8:
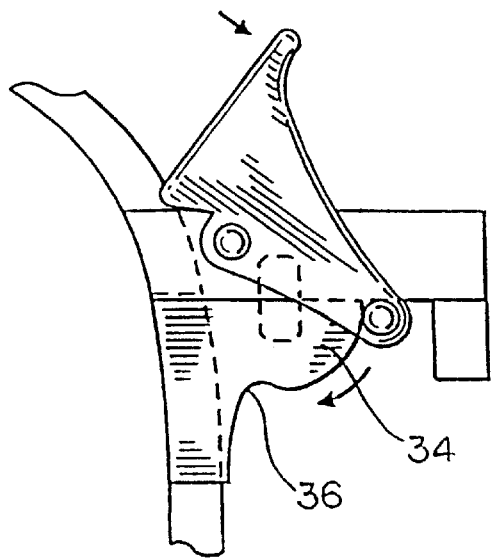
Figure 9:
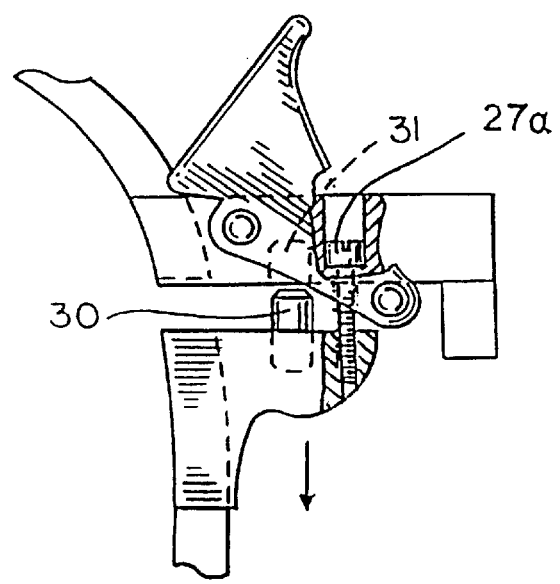
Figure 14:
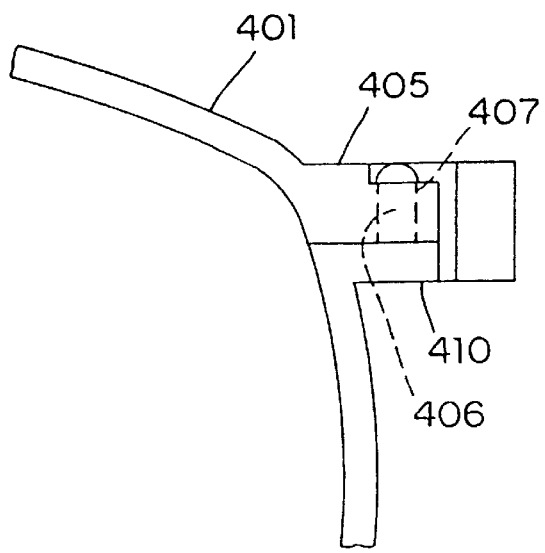
Figure 15:
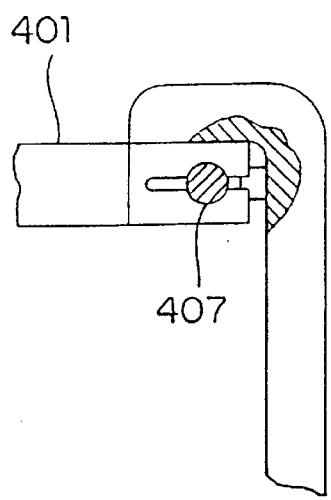
Figure 16:
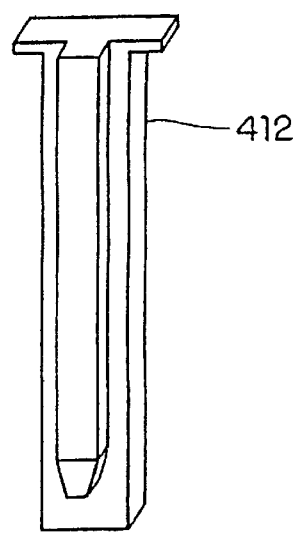

FIGS. 7–9 of the drawings illustrate another embodiment of the invention. As shown in FIG. 7, a rotatable latch 27 is employed for opening and closing the frame 1 for the removal of the lenses. FIG. 7 shows the frame 1 in the close-locked position. The frame 1 has a temple portion 25 which has an alignment recess in which an alignment pin 30 is positioned in place and the frame 1 is in the close-locked position of FIG. 7.

A rotatable latch (27) as shown in FIGS. 7–9 can be utilized to open the frame 1 for removal of the lenses. In the release position (see FIG. 9) the side of the frame 1 may be opened to release the lenses. When a new lens is held in place the user pushes the upper and lower sections of the frame together. An alignment pin 30 fits into the alignment recess 31 so that the ends of the frame will be near one another as they clamp (see FIG. 9).

When the user pushes the top of the rotatable latch 27 when the ends are close to one another by means of the alignment pin 30 and the alignment recess 31, the rotatable latch 27 moves or rotates clockwise about the pivot pin 28. The latch pin 32 moves in the contact with the cam 34 as the rotatable latch 37 rotates as shown in FIG.8. As rotatable latch 27 continues rotating in the clockwise direction, the latch pin 32 and the cam 34 become tighter due to the profile of the cam 34. As rotatable latch 27 continues to rotate in the clockwise direction, the rotatable latch 27 ends in position with the latch pin 32 engaged in the locking recess 36 as shown in FIG. 7.

The radial distance from the locking recess 36 to the pivot pin is shorter than it is to the cam 34. Therefore, the latch pin 32 utilizes the locking recess 36 in a detente fashion.

With the latch pin 32 locked within the locking recess 36, the rotatable latch 27 is held in a stable detente position. In this position, the frame is held together and cannot easily be removed.

By lifting the rotatable latch 27, counter clockwise rotation is started therein. The latching pin 32 is then released from the locking recess. The latch pin 32 moves along the cam 34, gradually reducing the tension between the upper and lower frame portions. The rotatable latch 27 rotates counter-clockwise until the latch pin 32 releases from the cam 34 (see FIG. 8). It is in this position that the upper/lower frame portions can be easily pulled apart from each other so that the lens can be removed (see FIG. 9).

An optional feature, shown in FIG. 7 of the drawings, is a limit screw 34, which prevents the frame from opening more than approximately 0.05 inches (see FIG. 8).

FIGS. 10–13 show another embodiment of the present invention in which a lever 304 is pivotally mounted onto the eyeglass frame 305 by means of pivot pin 303 (see FIG. 12) so that the lever 304 can open and close the eyeglass frame 305 with a restricted amount of movement to prevent the lenses from dropping out while opening or in the fully opened position and to ensure that the eyeglass frame 305 is closed flush in the closed position.

In the embodiment of FIG. 10 a slot 301 is provided for a journey pin 302 which the slot 301 moves along from one end at the journey pin 302 (FIG. 10) to the other end of the slot at the journey pin 302 (FIG. 11) from a closed position to an open position (and vice versa). The distance between the journey pin 302 and the pivot pin 303 is at its greatest when the lever is in the open position (See FIG.11). The distance between the journey pin 302, the pivot pin 303, is at its smallest when the lever 304 and the frame 305 are in the closed position (See FIG. 10). This movement of the slot 301 about the journey pin 302 limits the distance which the frame 305 can be opened to preferably 0.1" for plastic frame and a 0.05" for a metal frame.

The preferable minimum distance between the journey pin 302 and the pivot pin 303 is 0.219 inches for the frame 305 and the lever 305 in the closed position and 1.4×0.219 inch distance between the journey pin 302 and the pivot pin 303 for the frame 305 and the lever 305 in the open position. Alternatively this mechanism can be reversed so that the lever 304 is opened or closed 180 degrees in the opposite direction from that shown in FIGS. 10 and 11. It is understood that these dimensions are not intended to be limiting and other frames of various sizes may be constructed of different dimensions in accordance with the present invention.

FIG. 13 shows a sectional view illustrating that pin 303 goes through sides A and B of lever 304 and the frame 305.

FIGS. 14–18 illustrate another embodiment of the present invention. In this embodiment the mechanism for opening and securely closing the eyeglass frame 401 includes upper and bottom temple portions 405, 410, respectively, for each of the two temple sections of each side of the eyeglass frame 401. A pin or projecting member 406 is mounted on top of the bottom temple portion 410 and the pin 406 is received inside a recess 407 of the upper temple portion 405. As shown in FIG. 17, release means in the shape of a release member 412 can be inserted through the upper temple portion 405 to put pressure on top of on the pin 406 in the recess 407 to cause it to become dislodged from the recess 407 causing the upper temple portion 405 and bottom temple portion 410 to separate thereby permitting the lenses of the eyeglass frame 401 to be removed and replaced as desired. The release member 412 can be longitudinally extending in shape and have a tapered end (FIG. 16) which first enters through the opening or chamber of the top surface of the upper temple portion 405. The pin 406 is preferably slightly larger in diameter than said recess 407. The pin 406 can then be reinserted by hand into the recess 407 to securely lock the upper temple portion 405 and the bottom temple portion 410 together so that the eyeglass frame 401 is securely closed in place with the lenses contained there.

It is preferable if the release member or key is utilized by an optician, optometrist or ophthalmologist.

The embodiment can be made for metal and plastic frames and made of metal or plastic materials.

FIGS. 19–23 illustrates still another embodiment of the present invention in which the upper and bottom temple portions 505 and 510, respectively of each side of the frame 501 of eyeglasses, are disengageably attached to each other. The upper temple portion 505 on each side of the frame 501 includes an overhanging piece or flap 511 which can be pulled outward a little and the overhanging piece 511 thus has some play or flexibility in it due to the flexibility of the overhanging piece 511 and due in part to the gap 503. A portion of the bottom temple portion has a grooved or recessed portion 513 for mounting on the overhanging piece 511 and this grooved portion 513 disengages from the overhanging piece 511 when the overhanging piece 511 is pulled outward so that the upper temple portion 505 and the bottom temple portion 510 separate so that the lenses can be removed and replaced in the frame 501.

When the grooved portion 513 of the bottom temple portion 510 is pushed back into place onto the overhanging piece 511, the frame is closed securely in place. This embodiment can be made for metal or plastic frames and made of metal or plastic materials.

Referring now to the embodiment(s) of FIGS. 24–27, FIG. 24 illustrates an eyeglass frame having a cam mechanism 615 located at each temple portion (shown in the drawings only on the left temple portion for illustrative purposes but understood to be the same for the right temple portion of the eye glass frame).

The cam mechanism 615 includes a hinge pin 617 (FIG. 27A) and a cam lock 616. The cam lock 616 includes a pair of cam heads 614 at one end of the cam lock 616 attached to an arm 612 with the pair of cam heads 614 sandwiching the hinge pin 617 (as shown in FIG. 27B) and connected thereto with the bottom portion of the temple portion 610 of the frame by pivot pin 613, so as to be pivotally connected together. The hinge pin 617 is recessed within the temple portion in a hole 604 as shown In FIG. 24. FIGS. 27A and 27B show the hinge pin 617 alone and connected to the cam lock 616, respectively. The hinge pin 617 in the temple portion connects the cam lock 616 to the bottom temple portion 610 at the pivot point 613 as shown in FIG. 24.

In FIG. 24 the arm 612 is shown in an upward position when the upper portion 605 and bottom portion 610 of the temple portion of the frame is closed and the cam lock 616 and cam heads 614 are closed and locked in place. However the arm 612 could also be configured to be located in a downward position for the closed frame position, but it is understood that the arm 612 can also be configured in an upward position, if desired and is not limited to any one orientation for the invention.

Further, the arm 612 is shown flush against a surface 611 of the eyeglass frame, a side surface 611. It is understood that the arm 612 could be against any surface of the frame such as the front or back surface adjacent to the temple portion and preferably the back surface to conceal the arm and enhance the aesthetic appeal of the frame.

The cam mechanism 615 operates as indicated by the arrows A, B of FIGS. 24 and 25, respectively. FIG. 24 shows the frame in its closed position. When the arm 612 is moved in the direction of the arrow A in FIG. 24 it causes the cam heads 614 and cam lock 616 to rotate out of engagement with the bottom portion 610 of the temple portion of the frame causing the eyeglass frame's top 605 and bottom 610 portions to separate from each other a distance C of preferably 1/16th of an inch permit the lens in the frame to be removed and replaced.

By lifting the arm 612 back up in the direction of the arrow B of FIG. 25, the top 605 and bottom 610 portions come together and the frame is closed with the cam heads 614 rotating back into engagement with the bottom surface 618 of the bottom portion 610 of the temple portion of the frame. In FIG. 25 an improvement of the invention of FIG. 24 is shown in that the bottom surface 618 is curved to permit the cam heads 614 to fit within the curve of the bottom surface 618 when the frame is in the closed position. This feature keeps the cam heads 614 from protruding outward as much from the frame and enhances the aesthetic appeal of the frame.

FIG. 26 shows the cam mechanism from a bottom view of FIG. 24.

FIG. 27A shows the hinge pin 612.

FIG. 27B shows the hinge pin mounted (without the frame for easy illustration of the cam mechanism 615) by the pivot point to the cam heads 614 of the cam lock 616.

FIGS. 28 and 29 illustrate another embodiment of the invention of FIG. 24 in which a spring latch mechanism 620 locks the arm 612 in place when the cam mechanism 615 is in its closed or locked position. FIG. 29 is a top view of FIG. 28. The latch 620 can be lifted to release the arm 612 as shown by the arrow of FIG. 28. The latch 620 can be formed as a spring wire or a clip. Preferably a 0.020 inch spring wire is used.

FIGS. 30 and 31 are an alternative embodiment of FIG. 28 in which the latch mechanism 620 is L-shaped. FIG. 31 is a top view of the latch mechanism 620. The latch 620 can be lifted in the direction of the arrow D as shown in FIG. 30 to release the arm 612. The latch 620 can be formed using leaf spring material for the clip. Preferably a 0.020" thick leaf spring material is used.

Figure 32:
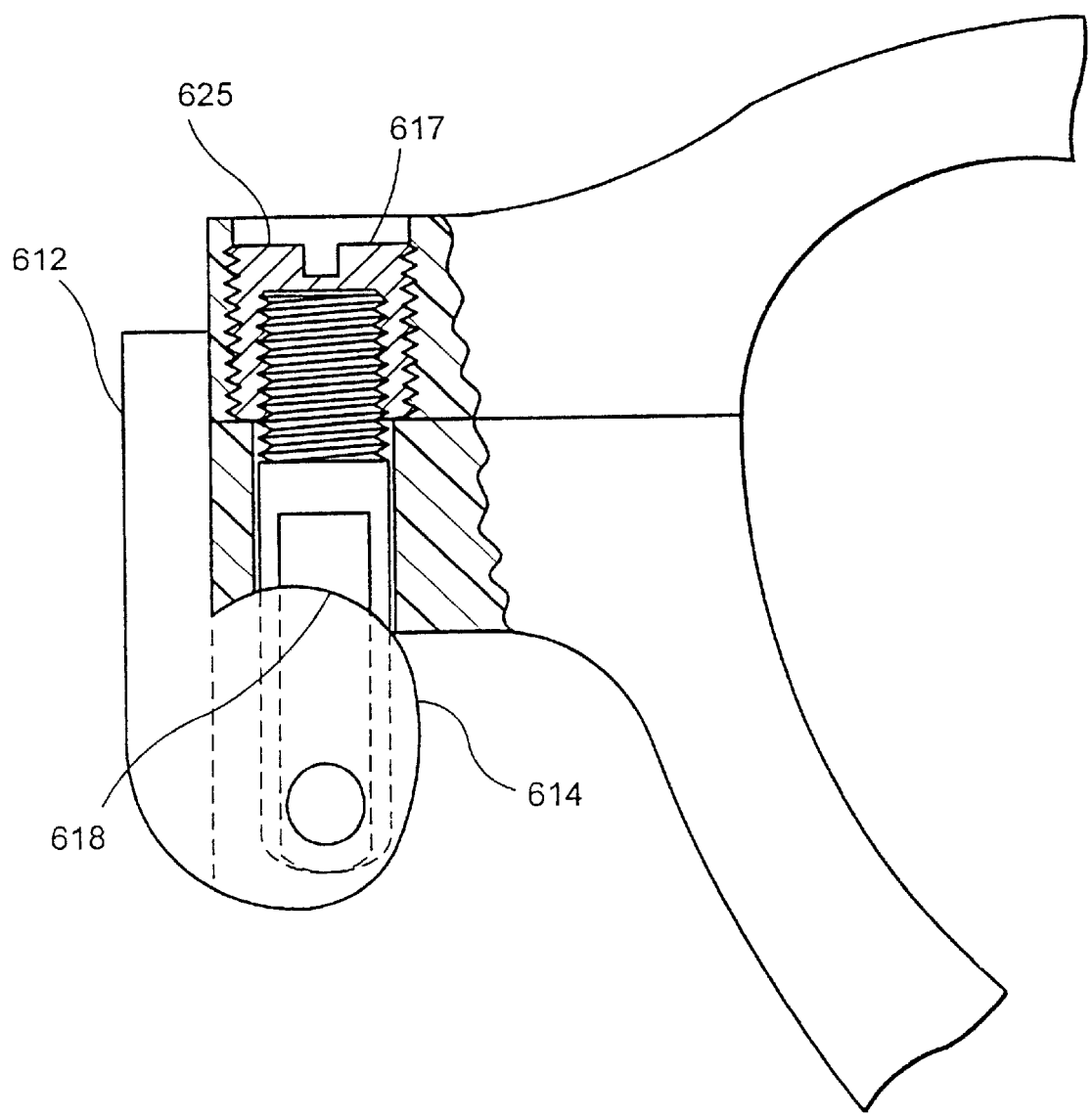
FIG. 32 is another embodiment of the invention of FIG. 24 in which the frame can be fine tune adjusted to close completely when the cam lock is in the closed-locked position.

FIG. 32 is another embodiment of the invention of FIG. 24 in which a threaded insert 625 can provide for a fine tuned closing the temple portion of the frame thereby preventing it from falling open by accident. The hinge pin 617 is provided with threading to threadably engage the threaded insert 625 thus be fine tune screwed tightly in place to ensure that the frame does not accidently jar open.

In this embodiment the hinge pin 617 has a thread on it to ensure that temple portions of the frame are tightly closed, preferably, a size 2,56 pitch screw threaded insert with a 0.80 thread in the center.

While presently preferred embodiments have been described for purposes of the disclosure, numerous changes in the arrangement of method steps and apparatus parts can be made by those skilled in the art. Such changes are encompassed within the spirit of the invention as defined by the appended claims.

What is claimed is:

1. An eyeglass frame having lenses and a bottom portion and an upper portion comprising:

a cam mechanism including a cam lock formed of a pair of cam heads connected to an arm of said cam lock, a hinge pin extending through a hole in a temple portion of said frame, said pair of cam heads being pivotally connected to said hinge pin and to said bottom portion by a pivot point so that when said arm is moved in a first direction said cam heads rotate away from said bottom portion and cause said bottom portion and said upper portion to separate a distance thereby opening said frame for a lens to be removed or replaced; and said arm being moved to a second position opposite said first position which cause said cam heads to rotate back into engagement against said bottom portion thereby causing said bottom portion to come together with said upper portion and said frame to close.

2. The frame according to claim 1 further comprising a release means formed as a latching member for holding said arm of said cam mechanism in place and permitting said arm to be moved when said latching member is opened so that said frame can be opened.

3. The frame according to claim 2 wherein said latch member is L-shaped.

4. The frame according to claim 1 wherein said frame is made of metal.

5. The frame according to claim 1 wherein said frame is made of plastic.

6. The frame according to claim 1 further comprising a through screw extending through each temple portion and connected at said pivot point area to said cam heads so that said to connect said cam mechanism to said frame .

7. The frame according to claim 6 further comprising said through screw has a threaded insert to more tightly close said frame and bring said upper portion and said bottom portion of said temple portion together.

8. The frame according to claim 1 wherein said distance is approximately 1/16 of an inch.

9. The frame according to claim 1 wherein said latch mechanism is made of 0.020 inch spring wire.

10. The frame according to claim 1 wherein said bottom portion has a bottom side against which said cam head's rests when said arm is in said first position and said bottom of said bottom portion is curved inward to accommodate said cam head's shape so that said cam heads does not protrude as much thereby making the eyeglass frame more aesthetically appealing.

* * * * *